April 2, 1963 C. R. TATE Re. 25,363

MAGNETIC WRITING MATERIALS SET

Original Filed Oct. 27, 1961

INVENTOR:
CLARENCE R. TATE
BY Frank Groom Kirby
ATTORNEY

United States Patent Office

Re. 25,363
Reissued Apr. 2, 1963

25,363

MAGNETIC WRITING MATERIALS SET

Clarence R. Tate, 307 E. Court St., Fairfield, Ill.

Original No. 3,036,388, dated May 29, 1962, Ser. No. 148,134, Oct. 27, 1961. Application for reissue Oct. 29, 1962, Ser. No. 233,990
25 Claims. (Cl. 35—66)

Matter enclosed in heavy brackets [ ] appears in the original patent but forms no part of this reissue specification; matter printed in italics indicates the additions made by reissue.

The history of writing materials begins with the stylus and clay tablets. It has progressed through the developments of art to the use of a wide variety of media, instruments and tools. Lithography, in which the artist works directly upon the "stone" was invented in the last century, as a development branching off from the etching plate upon which early artists worked directly with needles or gravers.

Modern lithography received its great impetus with the invention of the half-tone screen, by means of which areas of colors can be reproduced as composites of three primary colors, each printed as a series of "dots" of varying sizes. The use of the "dots and holes" of modern lithography has been necessary to define the resolution with which reproduction can be attained.

I have invented a set of magnetic writing materials, and a method of writing therewith, which is related to the reproduction of linework by means of dots.

The principal object of my invention is to produce a completely magnetic set of writing materials. The writing surface is composed of magnetic particles or granules, the writing instrument is composed of a magnetized tool, and the writing eraser is also composed of a magnetized instrument.

A further object of my invention is to produce a dust-free and clean set of writing materials, with none of the many disadvantages inherent in the use of chalk with a blackboard, and the traditional chalk eraser which only serves to smear chalklines into grey smudges, while spreading great amounts of chalkdust in the air.

An additional object of my invention is to produce a set of writing materials which will not dirty or otherwise affect the hands and clothing of the individual writer, such as is common with ink and pencil in combination with the ordinary paper.

A still further object of my invention is to provide a set of writing materials, in which no drying fluid will form a part of the combination, in which permanence or stability of the writing is inherent in the materials themselves.

The above and other objects of my invention will be apparent to those skilled in the art from a study of the accompanying drawings forming a part of this specification and illustrating in the different figures several views of the particular embodiment of the invention.

Figure 1:
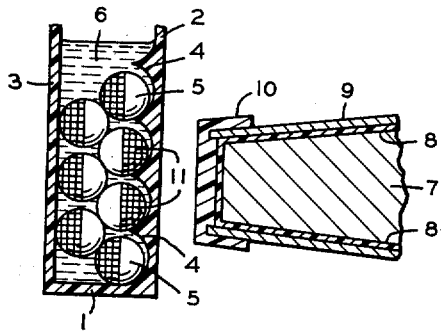
FIGURE 1 is a cross-section view through the writing surface together with a portion of the writing instrument involved.

Referring now particularly to FIG. 1, the numeral 1 is given to the writing surface or sheet. The surface 1 is seen to consist of a front surface 2 and a rear surface 3, which together form a hollow cavity, which is fluid tight. I prefer to have both the front surface 2 and the rear surface 3 made of a plastic material such as plexiglas, or other acrylics, which are either transparent or translucent, to light in the visible wavelengths.

Front surface 2 is molded on its inner side with a series of pockets or foraminations as shown in FIG. 1. In the embodiment shown the pockets 4, 4 consist of indentations made in the form of sections of the surface of a sphere, all identical.

Disposed between the front surface 2 and the rear surface 3 are a number of particles. I have chosen to illustrate these as spheres although they may be granules, pellets, and indeed may be irregular in form. In the preferred form these particles are spheres of a slightly smaller diameter than the diameter of the pockets on the inner side of the front surface 2. The spheres are numbered 5, 5. In the preferred embodiment there are two vertical rows of these spheres, and they are positioned in staggered relationship. In fact I prefer to restrain them in a condition such that the distance between the inside of the front surface 2 and the inside of the rear surface 3 is less than two times the diameter of the particles. Thus the particles are not only staggered but crowded.

Also filling the cavity between the front surface 2 and the rear surface is a solution in the form of a liquid 6. In the complete writing surface or sheet, I prefer to have the cavity filled entirely with this solution and to have no air bubbles.

The specific gravity of the solution 6 and the density of the particles 5 is quite close, by choice, so that the particles tend to float without appreciable friction, either from other particles or from the inner walls of the surfaces. As a consequence the particles 5 are free to rotate in their restrained positions, that is they are free to rotate but they cannot move translationally. Each particle is constrained to remain always next to its immediately adjacent neighbors in touching abutment.

The particles are made by mixing an aggregate of equal parts of barium ferrite, a magnetic material of high retentivity, and plaster of Paris or some other such filler and binder. Another possible combination is barium ferrite together with wood flour and glue. The aggregate is in the former case, mixed thoroughly together and then mixed with water. It is then molded into balls or spheres and allowed to harden, whether by the addition of heat or the passage of time.

The purpose of mixing equal parts of the barium ferrite with a filler is to lower the unit volumetric magnetization of the spheres below the point at which they will stick together with magnetization. At this point, I magnetize the spheres so that there is a north pole at one point on the sphere surface and a south pole situated 180 degrees away from the north pole, that is, on the opposite side of the sphere. I then paint one pole, for instance the north pole a dark color such as a black and the opposite pole a light color or I may leave the latter unpainted in which case it is the color of the mixture of plaster and barium ferrite, which is a chalky mixture and equivalent to white.

The outer surfaces of the spheres may be painted in two equal areas of color, but I prefer to have a "dominating" color. For this purpose, in the illustration of FIG. 1, I have used white as the dominating color. This means that the white area is approximately 55% of the total area of a given sphere, whereas the remaining color, black is allowed to cover only 45% of the total area.

For "writing" on the sheet 1, I use a bar magnet in the shape of a pencil and having a writing tip between two and three times as wide as the diameter of the spheres 5, 5. The tip is numbered 7 and is magnetized in the illustration of FIG. 1 with a south pole. The tip 7 is covered with a thin film of plastic 8.

Wrapped around the magnet, outside the plastic film 8 is a conical shell 9 made of soft iron which extends past the tip of the magnet 7. The purpose of this shell construction is to restrict the field of the magnet so that while the field extends beyond the tip, horizontally in FIG. 1 to influence the balls, it will not extend sidewise of the soft iron shell 9, that is, vertically in FIG. 1. This means that the field can only affect the positions of two balls at one time.

The entire assembly, including the extending soft iron cone is provided with a boot 10 formed of plastic. The purpose of this boot is to protect the plastic front surface 2 from scratching by the writing instrument tip.

As the tip 7 of the writing instrument is brought close to the front surface 2, the two spheres immediately adjacent the tip 7 will rotate in their pockets or sockets 4, 4 so that these two spheres numbered 11, 11 will present their north sides, the black sides to the right of FIG. 1, that is to the front surface. If the magnetized tip 7 has a strong enough field, a ball or two located behind the first column will also rotate, although I have not illustrated this in FIG. 1.

Figure 2:
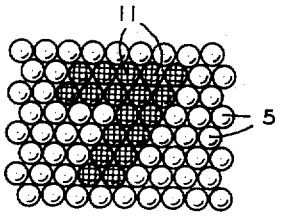
FIGURE 2 is a plan view of a portion of the writing surface as it appears to the writer.

Thus in writing the tip 7 is merely rubbed lightly over the front surface 2 and a re-orientation of the spheres occurs. Whereas at the beginning all the spheres were aligned so that their white sides, that is, the south poles were at the right in FIG. 1, now those spheres or particles nearest the tip 7 have been rotated so that they are oppositely aligned. The result is shown in FIG. 2, where the numeral seven is shown, written in a two column wide stroke in black, as it appears on a background of white.

Figure 3:
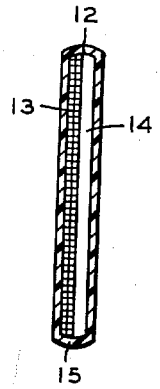
FIGURE 3 is a side view of the magnetic eraser.

In FIG. 3 I illustrate the eraser of the writing set, which consists of a magnet 12. The erasing magnet is a rectangular shape. On one side, the black, 13, it is magnetized north, whereas on the opposite side it is magnetized south, 14. The entire eraser magnet is encased in a covering 15 of thin plastic which is soft and will not mar or ruin the writing sheet by being rubber against it.

The eraser is used in the following way. The side which is magnetized north, 13, is laid against the front surface of the sheet 1, and then patted against that sheet. This action causes the south poles of the spheres to be attracted to the north poles of the eraser. All the spheres are thus aligned with their south sides, the white ones, to the right in FIG. 1. The numeral seven of FIG. 2 has been "erased," and the spheres 11, 11 of FIG. 1 have rotated to their original positions.

For a blackboard-sized sheet I prefer to use spheres or particles having a diameter of approximately 25 to 35 mils, that is approximately one-thirty-second of an inch. Thus the tip of the writing instrument is approximately one-sixteenth of an inch wide and the resulting line drawn by the writing instrument is the same width as that of the writing tip.

For a portable hand toy or ordinary letter-sized writing sheet, I prefer to use particles of a size between 5 and 10 mils though they can of course be made smaller or larger as preferred. Smaller particles have been made by spraying or forcing the aggregate of barium ferrite and plaster through a spray gun so that they dry and harden before they land, in the manner of shot dropped through a layer of heated air. These smaller particles are then laid on a sheet of aluminum and passed through a magnetizing field, and painted in any of the customary manners for small particles. The 5 mil particle results in a line 10 mils wide on the writing sheet.

Figure 4:
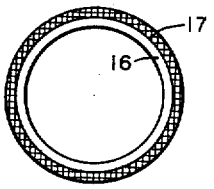
FIGURE 4 is an end view of an alternative eraser.

In FIG. 4 I show an end view of an alternative eraser magnet which is formed of a sheet of iron. This sheet is magnetized oppositely on its flat sides and then bent into the form of a cylinder. Thus an inner and outer surface is formed, 16 and 17. This cylinder magnet eraser can then be rolled across the writing surface to erase the "writing." The north polar surface 17 attracts the south poles of the spheres and rotates the spheres 11, 11 of FIG. 1 to their original positions. If desired, the cylinder magnet eraser can be provided with a handle, so that it resembles a rolling pin, if the handle is on the end, or it can be made like a paint roller, in which case the handle is set perpendicular to a wire running down the center of the cylindrical magnet.

It is possible to vary the above proportions between wide margins. I have used a mixture of one-third barium ferrite with two-thirds plaster. In this case it was necessary to change the density of the solution 6 in order to keep the particles buoyant and lower their friction against each other. To vary the density, common table salt, in varying proportions, may be used; it is added simply by dissolving in water. Many water-soluble salts can be used alternatively, and even organic salts may be used in connection with an alcohol or other organic solvent. As little as one-tenth barium ferrite may be used, in which case the magnetic forces are very weak. Again the solution may be omitted when a writing tip of relatively stronger magnetization is employed. The stronger magnetization will provide greater magnetic forces to turn the spheres. In this case the buoyancy forces of the solution are not required, to overcome the friction forces between the particles.

Also it will be obvious to those practicing the invention that more than two vertical columns may be employed and that the dimensions of the tip with respect to the diameter of the particles may be greater or lesser. Similarly the back surface may be used as the front surface, so long as it is transparent like the front surface 2. Also another possible modification is to leave out the pockets and use a writing tip with relatively stronger magnetization, which can itself overcome the friction forces between the particles holding them in position.

Various other modifications and alterations may be made in the combination as will be apparent to those skilled in the art. The scope of the invention therefore should not be considered as limited to these specific details but is to be ascertained from the appended claims.

I claim:

1. A set of writing materials consisting of a writing sheet in the form of a front surface and a rear surface, a series of magnetized balls disposed between said front surface and said rear surface in columns, pockets formed on the inside of said front surface and one column of said balls disposed in said pockets, and a friction-lessening solution filling the spaces between said surfaces and said balls, each ball magnetized with a north and a south pole, said north poles being painted one coolr and said south poles painted with a contrasting color, a writing instrument consisting of a magnet formed with a pole at one tip and a covering for said pole in the form of a plastic film, a surrounding shell of soft iron which extends beyond the writing tip of said magnet, and a plastic boot covering said writing tip.

2. The combination of claim 1, wherein the writing instrument is provided with a magnetized tip approximately twice as wide as the diameter of the magnetized balls.

*3. A set of writing materials consisting of a writing sheet in the form of a front surface and a rear surface, a plurality of magnetized particles disposed between said front surface and said rear surface, each particle magnetized with a north pole and a south pole, each particle being one color over the north pole and another color over the south pole, each particle being free to rotate under the influence of a writing instrument consisting of a magnet formed with a pole at one tip.*

*4. A marking set including a pair of spaced non-conductive surfaces at least one of which is transparent, said surfaces defining an internal cavity, a plurality of magnetized particles having opposed poles in said cavity, visible indicia on each particle distinguishing the individual poles thereof, and a magnetized implement adapted to be passed over the exterior of the transparent surface to*

*attract a common pole of those particles immediately adjacent its path of travel to form a discernible pattern.*

*5. A marking set including a pair of spaced non-conductive surfaces at least one of which is transparent, said surfaces defining an internal cavity, a plurality of magnetized particles having opposed poles in said cavity, visible indicia on each particle distinguishing the individual poles thereof, and a magnetized implement adapted to be passed over the exterior of the transparent surface to attract a common pole of those particles immediately adjacent its path of travel to form a discernible pattern, said particles comprising spheres having diametrically opposed poles.*

*6. The structure of claim 5 wherein the inner surface of one of said panels is formed with a plurality of pockets of a size to accommodate an individual sphere.*

*7. The structure of claim 5 wherein said magnetic implement comprises an elongated article having opposite poles at its opposite ends, one of which will attract the opposite poles of said particles to form a distinguishable pattern and the other of which will repel said opposite poles of said particles to erase said pattern.*

*8. The structure of claim 5 wherein said cavity is closed and contains a fluid.*

*9. The structure of claim 8 wherein the spherical particles substantially fill said closed cavity to permit rotational but not linear movement, and said fluid fills the remainder of the space in the cavity to the exclusion of the formation of air bubbles.*

*10. The structure of claim 5 wherein the spherical particles are comprised of an aggregate of barium ferrite, a magnetic material of high retentivity and a binder to lower the unit volumetric magnetization of the particles below the point of magnetic adherence.*

*11. The structure of claim 5 wherein the indicia comprises a common colored area for similar poles of all said particles.*

*12. The structure of claim 5 wherein all of the particles are of substantially the same size, and the transverse width of said cavity is slightly less than twice the diameter of a single spherical particle.*

*13. The structure of claim 12 wherein the writing instrument is provided with a magnetized tip which is wider than the diameter of the magnetized particles.*

*14. A marking surface adapted to have a magnetized implement passed thereover to form a distinguishable pattern, including a pair of spaced non-conductive surfaces at least one of which is transparent, the said surfaces defining an internal cavity, a plurality of magnetized particles having opposed poles in said cavity, visible indicia on each particle distinguishing the individual poles thereof, one pole of each particle being adapted to be attracted by the magnetized implement to render the distinguishing indicia of said pole visible through the transparent panel.*

*15. A marking surface adapted to have a magnetized implement passed thereover to form a distinguishable pattern, including a pair of spaced non-conductive surfaces at least one of which is transparent, the said surfaces defining an internal cavity, a plurality of magnetized particles having opposed poles in said cavity, visible indicia on each particle distinguishing the indivdual poles thereof, one pole of each particle being adapted to be attracted by the magnetized implement to render the distinguishing indicia of said pole visible through the transparent panel, said particles comprising spheres having diametrically opposed poles.*

*16. The structure of claim 15 wherein the inner surface of one of said panels is formed with a plurality of hemispherical pockets of a size to accommodate an individual sphere, said particles comprising spheres having diametrically opposed poles.*

*17. The structure of claim 14 wherein said cavity is closed and contains a fluid.*

*18. The structure of claim 15 wherein the spherical particles substantially fill said closed cavity to permit rotational but not linear movement, and said fluid fills the remainder of the space in the cavity to the exclusion of the formation of air bubbles.*

*19. The structure of claim 15 wherein the spherical particles are comprised of an aggregate of barium ferrite, a magnetic material of high retentivity and a binder to lower the unit volumetric magnetization of the particles below the point of magnetic adherence.*

*20. The structure of claim 15 wherein the indicia comprises a common substantially hemispherical coloring for similar poles of all said particles.*

*21. The structure of claim 15 wherein all of the particles are of substantially the same size, and the transverse width of said cavity is slightly less than twice the diameter of a single spherical particle.*

*22. A set of writing materials consisting of a writing sheet in the form of a front surface and a rear surface, a plurality of magnetized particles disposed between said front surface and said rear surface, each particle magnetized with a north pole and a south pole, each particle being one color over the north pole and another color over the south pole, each particle being free to rotate under the influence of a writing instrument consisting of a magnet formed with a pole at one tip, said magnet having a covering in the form of a soft plastic film and a surrounding shell of soft iron.*

*23. A writing implement adapted to be passed over the exterior of a writing sheet in the form of a front surface and a rear surface having a plurality of particles, each magnetized with a north and south pole, disposed between said surfaces, with each particle having distinguishing indicia for each pole, said instrument consisting of a magnet formed with a pole at one tip, a cover for said pole in the form of a plastic film and a surrounding shell of soft iron.*

*24. A set of writing materials consisting of a writing sheet in the form of a front surface and a rear surface, a plurality of magnetized particles disposed between said front surface and said rear surface, each particle magnetized with a north pole and a south pole, each particle being one color over the north pole and another color over the south pole, each particle being free to rotate under the influence of a writing instrument consisting of a magnet formed with a pole at one tip, the inner surface of one of said panels being formed with a plurality of pockets for the accommodation of particles.*

*25. The structure of claim 24 wherein the space between said surfaces is fluid filled.*

References Cited in the file of this patent or the original patent

UNITED STATES PATENTS

| | | |
|---|---|---|
| 1,074,533 | Schowalter | Sept. 20, 1913 |
| 1,549,197 | Hanback | Aug. 11, 1925 |
| 2,096,360 | Heller | Oct. 19, 1937 |
| 2,530,013 | Hanback | Nov. 14, 1950 |
| 2,589,601 | Burnett | Mar. 18, 1952 |
| 2,836,773 | Skrobisch | May 27, 1958 |